Figure 1:
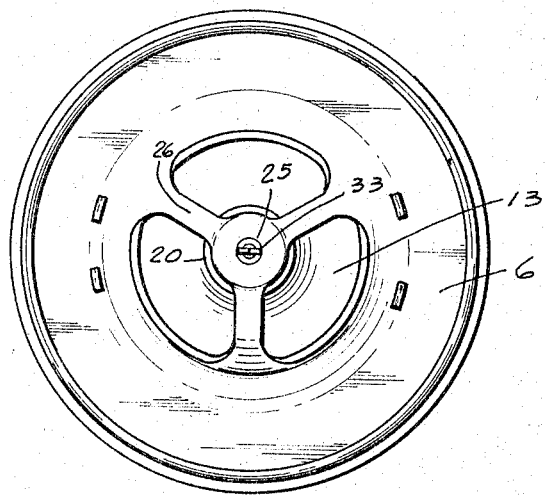

April 25, 1967

H. B. DRAPEAU 3,315,890

REVERSE ACTING DOUBLE PORT THERMOSTAT
WITH BUTTERFLY CHARACTERISTIC

Filed July 2, 1965

INVENTOR.
HAROLD B. DRAPEAU

BY *Hill, Sherman, Meroni, Gross & Simpson* ATTORNEYS

United States Patent Office 3,315,890
Patented Apr. 25, 1967

3,315,890
REVERSE ACTING DOUBLE PORT THERMOSTAT
WITH BUTTERFLY CHARACTERISTIC
Harold B. Drapeau, Oak Park, Ill., assignor to The Dole
Valve Company, Morton Grove, Ill., a corporation of
Illinois
Filed July 2, 1965, Ser. No. 469,285
5 Claims. (Cl. 236—34)

This invention relates to a reverse acting thermostat for controlling the flow of coolant through a combustion type engine and in particular to a double port thermostat having improved sealing and control characteristics.

The two principal characteristics desired in an automobile thermostat are low leakage and high control. The need for a low leakage feature is associated with a desire to enable a newly started engine to reach operating temperature as quickly as possible. To accomplish this, a thermostat is provided to obstruct the operation of the cooling system during the warm-up period. It is understood, therefore, if leakage is permitted and coolant is in fact allowed to circulate at this time, the thermostat has failed in one of its principal objectives.

While low leakage during warm-up is a desirable characteristic, high control is equally necessary. Not only must the engine be kept warm during an initial running period, but also the engine must be kept cool after the operating temperature has been reached. The latter requirement means that the thermostat must be highly responsive for being opened at a pre-set temperature level.

Two classes of thermostats have been developed for accomplishing the above objectives. These are known in the art as the poppet and butterfly types.

The poppet type thermostat generally involves a single valve member which is designed to be unseated against the direction of fluid flow in response to increasing system temperature. The principal advantage of this type of structure is the low leakage that can be expected during engine warm-up. This result derives directly from the fact that fluid pressure within the cooling system is directed for closing the thermostat and improving the sealing characteristic.

However, while the fluid pressure aids in seating a poppet type thermostat, it is an equal and opposite detriment during unseating. This is due to the fact that fluid pressure received at the valve head alters the thermal force required for unseating. It can be appreciated, therefore, that since fluid pressure in an automobile cooling system tends to be unpredictable, high control characteristics cannot be expected from a poppet type thermostat.

The butterfly type of thermostat overcomes this control obstacle in that one half of the butterfly valve swings in the direction of fluid flow for precisely compensating the other half which swings against the direction of fluid flow. However, while the effect of fluid pressure is nullified by the butterfly structure, this type of thermostat lacks the high sealing feature required for rapid warm-up at low temperatures.

Therefore, it is an object of this invention to provide a coolant thermostat having the advantages heretofore associated with both the poppet type thermostat and the butterfly thermostat.

It is also an object of this invention to provide a coolant thermostat having a high control and a low leakage characteristic.

It is another object of this invention to provide a coolant thermostat which is of the reverse acting poppet type and which has a double port therein.

It is a further object of this invention to provide a coolant thermostat of the poppet type having a main valve which is operated by an upstream valve movement and an auxiliary valve which is operated by a downstream valve movement.

Figure 2:
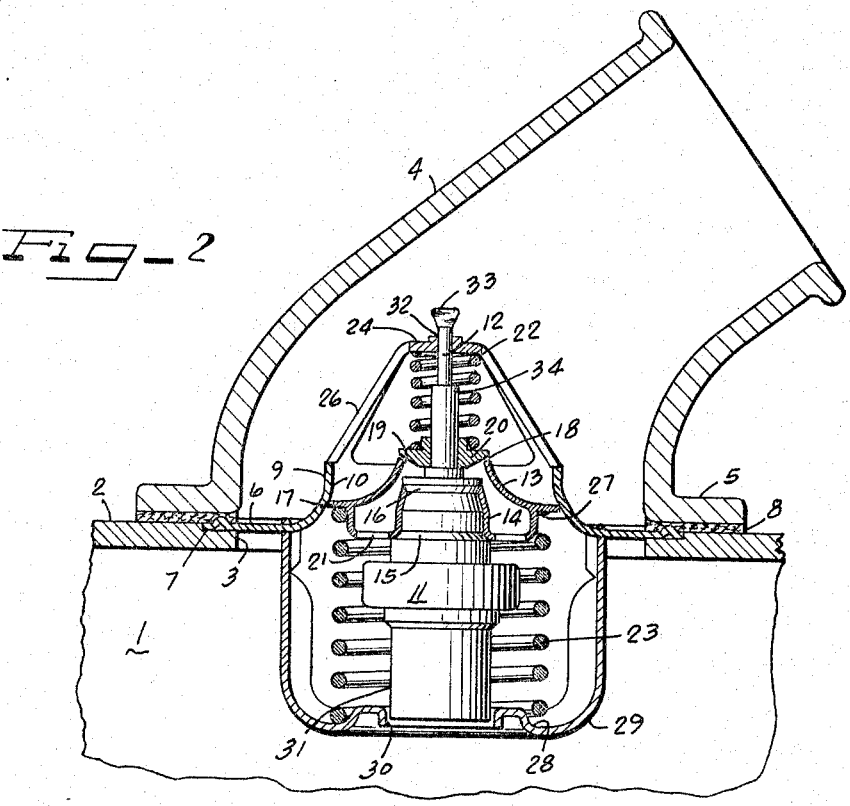

These and other objects, features and advantages of the present invention will be understood in greater detail from the following description and the associated drawings wherein reference numerals are utilized in designating a preferred embodiment and wherein:

FIGURE 1 is a top view of the double port thermostat according to this invention; and FIGURE 2 is a sectional view of the thermostat of this invention as disposed within a working environment.

A preferred embodiment of the thermostat of this invention is illustrated in FIGURE 2 mounted at an engine block within a conduit leading to a radiator unit. This thermostat is of the poppet type and, therefore, has the favorable low leakage characteristic required during engine warm-up. However, unlike previous thermostats of this type, this device is provided with a secondary or auxiliary valve member for releasing the fluid pressure which tends to inhibit the opening of the thermostat at the pre-set temperature.

In FIGURE 2, the thermostat is shown mounted within a conduit 1 of an engine block 2. An opening 3 within the block 2 conducts through a pipe section 4 which is designed for receiving a rubber water hose or the like for conducting the coolant to a radiator. The pipe 4 has an outwardly extending flange 5 which is generally bolted to the block 2 and which is used to secure a transverse wall 6 within a groove 7 formed at the periphery of the port 3; a gasket 8 is provided intermediate the flange 5 and the engine block 2 to assure a pressure seal therebetween.

As mentioned above, two valves are employed to control the flow of fluid from the conduit 1 to the pipe 4, and both valves are actuated by a single thermal sensitive unit having relatively extensible power members. The thermal sensitive unit of this device comprises generally a casing 11 and a power member 12 which is relatively extensible therefrom and which is disposed for being axially movable due to expansion or contraction of a thermal sensitive element contained within the casing 11. It can be appreciated, therefore, that if the casing 11 is maintained stationary relative to the transverse wall 6, increasing temperatures will force the power member 12 in an upstream direction. Likewise, if the power member 12 is held stationary relative to the transverse wall 6, increasing temperatures will force the casing 11 in a downstream direction. The thermostat of this invention operates in just this manner, namely, the casing 11 is held stationary while the power member 12 is allowed to move upstream for opening a relief valve. When the relief valve is fully opened, the power member 12 is then held stationary and the casing 11 is driven downstream for opening a main flow port. This sequence will be understood below.

Referring to the main valve first, it can be seen in FIGURE 2 that the transverse wall 6 has an upwardly curved throat 9 for defining the main flow port 10 between the conduit 1 and the pipe 4. The valve member which is cooperable with the throat 9 for controlling the flow of fluid through the main port 10 also takes the form of an upwardly curved throat 13 and is secured to the casing 11 at an inner collar 14 fitted between oppositely facing rims 15 and 16.

The valve member 13 has its outer edge 17 contacting the inner surface of the throat 9 for forming a pressure seal therewith and has its inner edge 18 disposed for defining an auxiliary port 19 which is communicable with the conduit 1 through a series of pressure relief ports 21 formed at a lower support wall between the collar 14 and the valve member 13. The power member 12 extends through the port 19 and is provided with a valve head 20 cooperable with the inner edge 18 of the valve member 13 for closing the auxiliary port 19. Therefore, it can be seen that both the valve members 13 and 20 must be in a closed position to prevent circulation of fluid within the system.

To assure that both valves will be closed at low temperatures, corresponding to a contraction of the thermal sensitive element, the members 13 and 20 are biased through the use of coil springs 23 and 22 respectively. The upper spring 22 engages the rear face of the valve head 20 and has its opposite end braced against a center disk 24 formed centrally of a stirrup 26 extending from the upper edge of the throat 9. Likewise the lower spring 23 engages the rear surface 27 of the member 13 and has its opposite end braced against the inner face 28 of a base frame 29 extending from the lower face of the throat 9. It can be observed, therefore, that the power unit is substantially suspended between the stirrup 26 and the base frame 29 by the two biasing springs 22 and 23.

Both the casing 11 and the power member 12 must be allowed to expand within this suspension system in order to actuate the valve members 13 and 20. This expansion is permitted through the provision for travel openings. The first such opening 30 is provided within the base frame 29 axially for allowing the casing 11 to be guided therethrough. The second travel opening 32 is provided within the stirrup 26 axially of the power member 12. The member 12 is received within the opening 32 and is permitted to move longitudinally according to the demands of the thermal sensitive element.

To accomplish the holding action described above, the longitudinal movement of the power member 12 within the opening 32 is limited, first by a radially enlarged slide stop 33 formed at its upper extremity and second, by another slide stop formed at the upper face 34 of its lower shank section. The power member 12 is effectively confined, therefore, to move between the upper and lower stops 33 and 34.

In operation, both valve members 13 and 20 will be biased into a closed position at low fluid temperatures. When normal engine operating temperature is reached, however, the thermal sensitive element will begin to expand for developing a relative motion between the casing 11 and the power member 12. To assure that this initial relative motion is directed entirely in an upstream path, the casing 11 is biasing upward with a force exceeding the downward bias on the member 12. Therefore, the casing 11 will be held stationary relative to the transverse plate 6, and the power member 12 will be caused to move in an upstream direction for raising the valve head 20 and opening the auxiliary port 19.

With increasing temperature the power member 12 will progressively extend upwardly within the travel opening 32 until the shank face 34 abuts the lower surface of the central disk 25. With the upward movement halted and the thermal expansion continuing, the casing 11 will be backed downwardly against the spring 23 through the travel opening 30. This downward motion will then carry the valve member 13 off the inner surface of the throat 9 for opening the main port 10.

It is to be noted that the valve member 20 is caused to move upstream thereby avoiding the obstruction characteristically associated with the poppet type thermostat. Also the effect of fluid pressure at the member 20 is minimized due to its relatively small cross sectional area.

In this manner a principal object of this invention is accomplished, namely, the opening of the auxiliary port 19, by raising the valve head 20, provides a significant pressure relief to the lower surface of the valve member 13. Thereafter downward movement of the member 13 is substantially unimpeded with the result that the control obtainable in this poppet thermostat is comparable to the high control associated with the butterfly type device.

It will be understood that various modifications may be suggested by the embodiment disclosed, but I desire to claim within the scope of the patent warranted hereon all such modifications that come within the scope of my invention.

I claim:

1. A double port thermostat for controlling the flow of fluid through a conduit comprising:
   a temperature responsive power unit having first and second relatively extensible power members,
   a supporting bracket for positioning said thermally responsive power unit within said conduit,
   a first valve means disposed for increasing the flow of fluid through said conduit in response to a downstream motion of said first power member,
   a second valve means disposed for increasing the flow of fluid through said conduit in response to an upstream motion of said second power member,
   means rigidly holding said second power member stationary during a downstream motion of said first power member,
   means rigidly holding said first power member stationary during an upstream motion of said second power member, and
   means generating a downstream motion of said first power member prior to an upstream motion of said second power member in response to increasing fluid temperature.

2. A double port thermostat for controlling the flow of fluid through a conduit comprising:
   a transverse wall positioned within said conduit,
   said transverse wall having a main port formed therein and having a stirrup and a base extending from opposite sides thereof,
   said stirrup having an opening formed therein for being substantially central thereto,
   a temperature responsive power unit having a casing and a power member relatively extensible therefrom,
   said power member having a first diameter portion disposed adjacent said casing and having a relatively smaller diameter portion extending through said opening and being axially movable therein,
   said opening being of a diameter which is less than the diameter of said first diameter portion of said power member,
   means guiding said casing for movement axially of said main port,
   a first valve member extending from said casing and being cooperable with said main port to control the flow of fluid therethrough,
   a first biasing means urging said first valve member in a direction for closing said main port,
   said valve member having an auxiliary port formed therein,
   said power member extending through said auxiliary port and having a second valve member in a direction extending therefrom for controlling the flow of fluid therethrough,
   and a second biasing means urging said second valve member for closing said auxiliary port,
   said first biasing means having a magnitude exceeding that of said second biasing means.

3. A double port thermostat for controlling the flow of fluid through a conduit comprising:
   a transverse wall positioned within said conduit,
   said transverse wall having a main port formed therein and having a stirrup and a base extending from opposite sides thereof,
   said stirrup having a guide opening formed therein for being substantially central thereto,
   a temperature responsive power unit having a casing and a power member relatively extensible therefrom,
   said power member extending through said guide opening and being slidably received therein,
   rigid means extending radially of said power member at both sides of said guide opening for limiting the axial movement of said power member therein, means guiding said casing for movement axially of said main port, and a first valve member extending from said casing for being cooperable with said main port to control the flow of fluid therethrough, said valve member having an auxiliary port formed therein, said power member extending through said auxiliary port and having a second valve member extending therefrom for controlling the flow of fluid therethrough.

4. A double port thermostat for controlling the flow of fluid through a conduit comprising:

a transverse wall positioned within said conduit, said transverse wall having a main port formed therein and having a stirrup and a base extending from opposite sides thereof, said stirrup having a guide opening formed therein for being substantially central thereto, a temperature responsive power unit having a casing and a power member relatively extensible therefrom, said power member extending through said guide opening and being slidably received therein, rigid means extending radially of said power member at both sides of said guide opening for limiting the axial movement of said power member therein, means guiding said casing for movement axially of said main port, a first valve member extending from said casing for being cooperable with said main port to control the flow of fluid therethrough, a first biasing means urging said first valve member for closing said main port, said valve member having an auxiliary port formed therein, said power member extending through said auxiliary port and having a second valve member extending therefrom for controlling the flow of fluid therethrough, and a second biasing means urging said second valve member for closing said auxiliary port, said first biasing means having a magnitude exceeding that of said second biasing means.

5. A double port thermostat for controlling the flow of fluid through a conduit comprising:

a transverse wall positioned within said conduit, said transverse wall having a main port formed therein and having a stirrup and a base extending from opposite sides thereof, said stirrup having a guide opening formed therein for being substantially central thereto, a temperature responsive power unit having a casing and a power member relatively extensible therefrom, said power member extending through said guide opening and being slidably received therein, rigid means extending radially of said power member at both sides of said guide opening for limiting the axial movement of said power member therein, means guiding said casing for movement axially of said main port, a first valve member extending from said casing for being cooperable with said main port to control the flow of fluid therethrough, a first biasing means urging said first valve member for closing said main port, said valve member having an auxiliary port formed therein, said power member extending through said auxiliary port and having a second valve member extending therefrom for controlling the flow of fluid therethrough, and a second biasing means urging said second valve member for closing said auxiliary port, said first biasing means having a magnitude exceeding that of said second biasing means, said second valve member being oriented to move in a downstream direction due to increases in fluid temperature, said first valve member being oriented to move in an upstream direction due to increases in fluid temperature.

References Cited by the Examiner

UNITED STATES PATENTS

| | | | |
|---|---|---|---|
| 2,137,136 | 11/1938 | Giesler | 236—34 |
| 2,174,042 | 9/1939 | Rose | 236—34.5 |
| 2,200,318 | 5/1940 | Yonkers | 236—34 X |
| 2,873,070 | 2/1959 | Drapeau | 236—34 |
| 2,926,853 | 3/1960 | Wood | 236—34 |
| 3,108,616 | 10/1963 | Ray. | |

EDWARD J. MICHAEL, *Primary Examiner.*